Feb. 26, 1924.

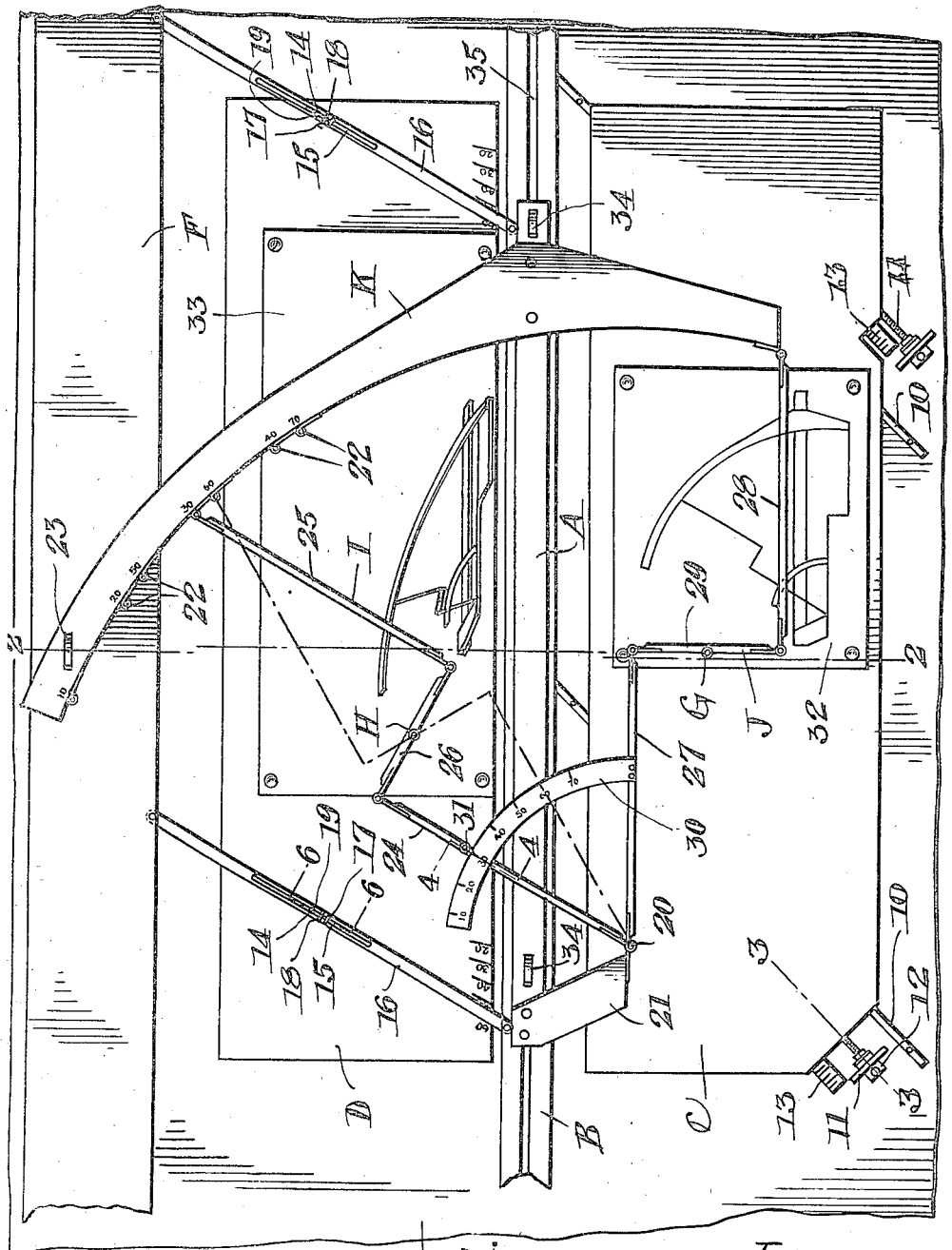

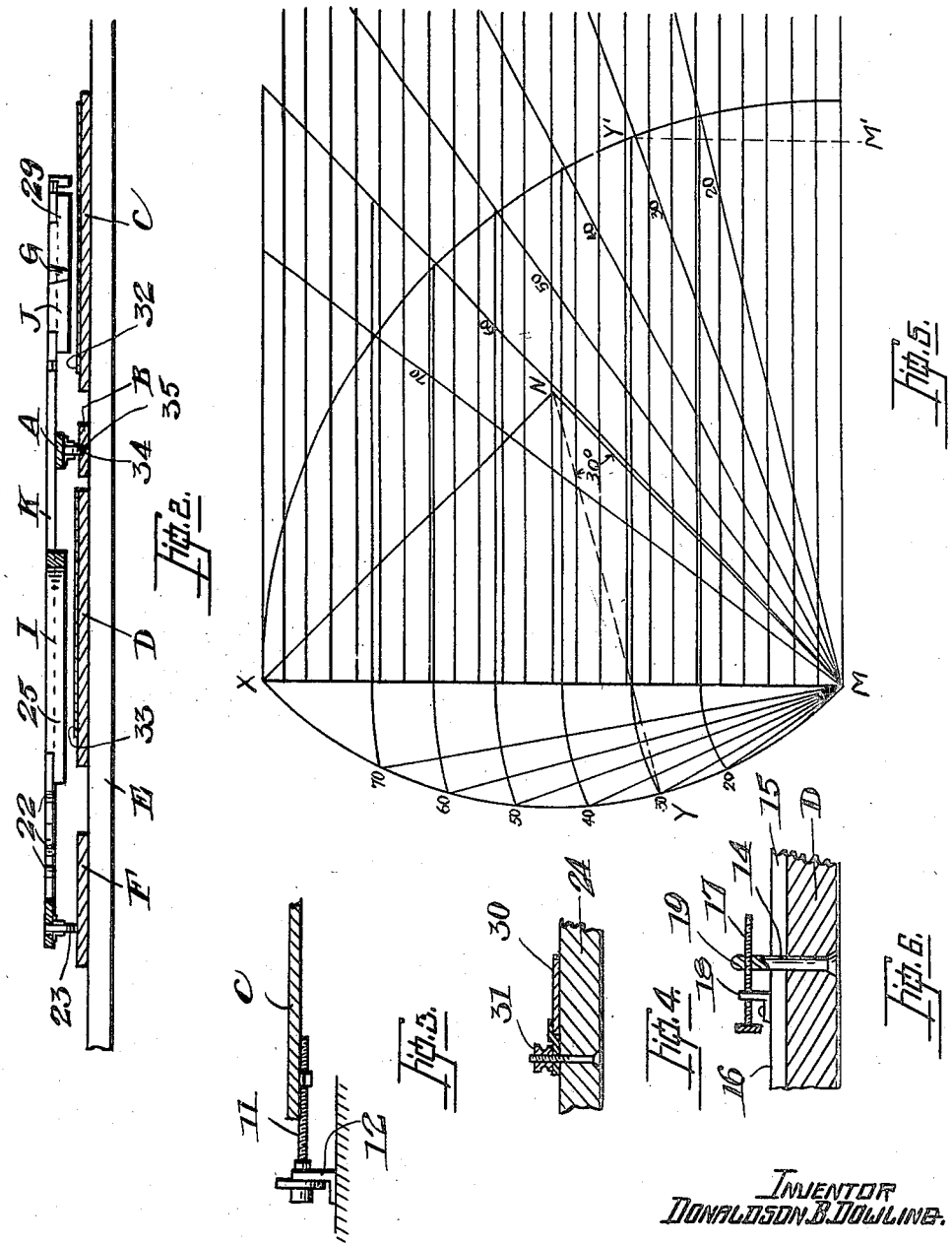

D. B. DOWLING 1,484,702

APPARATUS FOR DRAWING ISOMETRIC OR OTHER MECHANICAL PROJECTIONS

Filed Feb. 16, 1922 3 Sheets-Sheet 3

INVENTOR
DONALDSON B. DOWLING.

BY *Featherstonhaugh*
ATTYS.

Patented Feb. 26, 1924.

1,484,702

UNITED STATES PATENT OFFICE.

DONALDSON BOGART DOWLING, OF OTTAWA, CANADA.

APPARATUS FOR DRAWING ISOMETRIC OR OTHER MECHANICAL PROJECTIONS.

Application filed February 16, 1922. Serial No. 536,952.

*To all whom it may concern:*

Be it known that I, DONALDSON BOGART DOWLING, a subject of the King of Great Britain, of the city of Ottawa, in the Province of Ontario and Dominion of Canada, have invented certain new and useful Improvements in Apparatus for Drawing Isometric or Other Mechanical Projections, of which the following is a specification.

This invention relates to improvements in apparatus for drawing isometric or other mechanical projections, and the objects of the invention are to provide a simple and effective device by which isometric or other mechanical projections in which the point of view is at a distance or the lines of sight form parallel lines may be ascertained readily from a single dimension plan.

Further objects are to provide a device in which adjustments may be made to vary the angle of projection.

Further objects still are to improve and simplify the construction of the device to better adapt it to perform the functions required of it.

It consists essentially in the improved construction hereinafter described in detail in the accompanying specification and drawings.

In the drawings:

Figure 1 is a plan view of an embodiment of the invention.

Figure 2 is a section on the line 2—2, Figure 1.

Figure 3 is a section on the line 3—3, Figure 1.

Figure 4 is a section on the line 4—4, Figure 1.

Figure 5 is a plan view of a scale which may be used to indicate a comparative distance between the original plan and the projection.

Figure 6 is a section on the line 6—6, Figure 1.

In the drawings, like characters of reference indicate corresponding parts in each figure.

Figure 9:
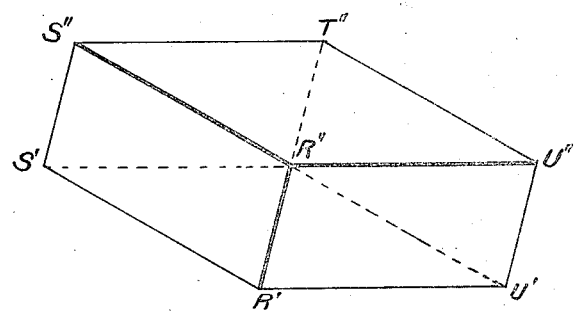
Figure 9 represents the isometric projection of the square shown in Figure 7 projected in three dimensions.
Figure 8:
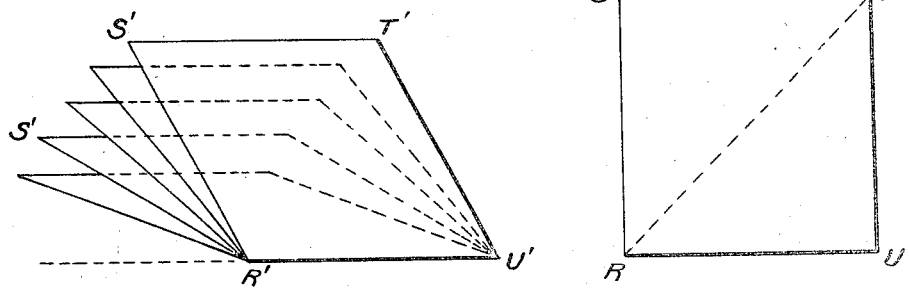
Figure 8 represents a series of projections of the square after it has been projected by the apparatus set at different angles.

Referring to the drawings:

A indicates a travelling carriage moving on a straight line track B. C indicates the movable easel or drawing board on which the plan to be projected is placed and hereinafter referred to as the drawing board, and D indicates the drawing board or easel on which the projection is to be thrown, hereinafter referred to as the projection board, both drawing boards being suitably mounted on a suitable drawing table E.

The drawing board is caused to move at a determined angle on guide tracks 10, the angle illustrated being that of forty-five degrees, the movement being regulated by slow motion screws 11 extending through brackets 12 on the table into the end of the drawing board, a suitable scale 13 being provided to indicate the extent of movement.

The projection board is also caused to move at a determined angle which is regulated by pins 14 extending in guide slots 15 in parallel guide bars 16 which are pivoted at one end to the carriage B and at the opposite end to a supporting member F which rests on the drawing board.

It will be seen that the angle of the guide bars 16 may be changed by changing the position of the supporting member F. The pins 14 are preferably adjusted in the slots by means of slow motion screws 17 extending through brackets 18 on the guide bars 16 and through projections 19 on the pins.

G indicates a tracing point and H a marking point or pencil which are carried respectively on two equal straight line link motion members I and J which are pivoted at one end or otherwise connected to a common center and at the other separately pivoted to points on an arc of a circle from this common centre. As illustrated, the members 24 and 27 are hinged at 20 to a projecting bracket 21 on the travelling carriage while their opposite ends are hinged to an arcuate member K secured to the travelling carriage, part of which extends below and part above the carriage, the member J being hingedly connected to one end of the arcuate member while the member I is connected at a determined point on the opposite side of the travelling carriage. The arrangement is such that the member I may be connected to a plurality of angular points dependent upon the angle of projection desired and for this purpose a plurality of hinged tracks or connections 22 are provided on the inner periphery of the arcuate member K at different points corresponding to different angles, the tracks shown being for 10, 20, 30, 40, 50, 60 and 70 degrees. The outer end of the arcuate member K carries a roller 23 designed to run on the supporting member F.

Each of the link motion members I and J consist of two equal bars or arms attached or hinged to the ends of another bar, not necessarily of the same length and which forms the central member itself. The member I comprises two equal bars 24 and 25 hingedly connected to the central bar 26 while the member J comprises two equal bars 27 and 28 hingedly connected to the central bar 29. The central bar 29 carries a tracing point G while the central bar 26 carries the drawing point H. An arcuate scale or protractor 30 is provided connected to the member 27 extending over the member 24 to which it may be secured in adjusted relation by a set screw 31 on the bar 24 designed to bear against the member 30. The plan, map or drawing 32 of which a projection is desired, is placed on the drawing board C while the paper or card 33 to receive the projection is placed on the projection board D. When the two ends of the link motion members I and J are rigidly connected to the arcuate member 30 and the two systems are in similar position, the central points G and H of each will trace the same figure or line and if the carriage remains stationary these figures or lines will be inclined to each other at an angle represented by ninety degrees minus the angle between the two arms 29 and 24. By arranging that the link motion J carrying the tracing point G traverses a line at right angles to the straight line track B while the carriage is stationary, the pencil point when the carriage is free to move will reproduce lines parallel to the track as lines also parallel to the track, and lines normal to the track as inclined lines of the same length. These are the elements of two dimensions of isometric projection. The third, or vertical dimension, which correctly should be a direction which bisects the angle between the two horizontal ones already determined is obtained by moving the drawing, map or plan in a direction which is at an angle of forty-five degrees to the central line or straight line track or by moving the easel on which the drawing is being projected, which motion is accomplished by the slow motion screws already referred to and controlled by the guiding means already described. The scales will indicate the vertical measurement. As the movement of the easel D on which the projection is being drawn is direct, the scale or magnitude of this motion is measured by the scale of the map or drawing being projected and is to be used for smaller angles registered on the drawing of the machine, or for projections showing an inclination to the horizontal less than sixty degrees.

For contour maps, the vertical scale between the contours often indicates a very slight movement. This is probably more easily obtained by the movement of the plan since the movement of the easel on which it is fixed is reduced and the scale to be used is coarser than the scale of the map or plan.

The movement of the carriage A on the guide track B may be eased by means of rollers 34 on the carriage extending in a groove 35 on the track.

Figure 7:
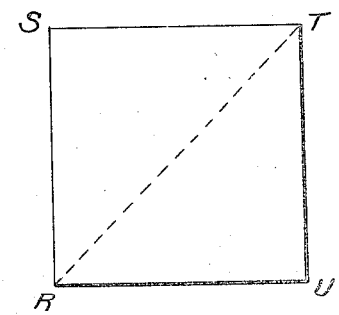
Figure 7 represents a drawing of a plan view of a square to be projected by the apparatus.

The determination of a scale to measure the vertical displacement that will be shown on the projection occasioned by the shifting of the drawing board on which the plan of the drawing is secured, is best arrived at by considering the projection of a simple drawing such as a square shown in Figure 7 of the drawings. The square R S T U once projected in one plan gives one of the parallelograms R' S' T' U' according to the angle at which the instrument is set.

As the shifting of the board is effected in a direction parallel to the diagonal R T of the square, the board is then moved an amount equal to a distance R T in the direction from R to T, and the Figure is retraced giving the second parallelogram R' S' T' U', which gives the isometric projection shown in Figure 9. By the elimination of the construction lines such as S' T' and T' U', we obtain the final projection of the drawing.

The measure of the vertical projection is in this case a distance R T obtained by the movement of the drawing board to which plan or drawing of the square is attached. Since the point T' always falls on the circumference of a circle with R' as surface, and radius R' U', the vertical movement shown in projection compared with the actual movement of the drawing board is the ratio between the chord subtended by the angle at which the apparatus is set, and the chord subtended by an angle of 90° for the same circle.

A method of more direct comparison which will illustrate the foregoing more clearly is shown in Figure 5 of the drawings, where M X is the chord subtended by a right angle, and M Y is the chord subtended by an angle of 30°. These chords are projected horizontally to meet the circumference of the circle passing through XY' with centre at M and radius equal to M X. Then the lines M X and M Y being radii the same circle are equal and can be graduated to the same scale as that attached to the drawing board. If the line M X is graduated in a natural scale such as inches or parts thereof or a decimal scale, and projected horizontally, the intersections in this scale with the line M Y' will give a direct comparison of the movement required of the drawing board.

In the case illustrated in Figure 5, for a setting at an angle of 30°, an actual vertical displacement of the drawing board through a length M Y' would give a projection of the length M' Y'.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. An apparatus for the purpose specified, comprising in combination, a movable carriage, a track supporting the same, an adjustable projection board, and an adjustable drawing board located on opposite sides of the track, a projecting bracket on the carriage, an adjustable arcuate member carried by the carriage concentric with the bracket, two equal straight line link motion members hinged at one end to a common centre on the bracket, and at the other separately to points on the arcuate member, a tracing point carried by one member, and a drawing point carried by the opposite member.

2. An apparatus for the purpose specified, comprising in combination a movable carriage, a track supporting the same, a projection board, and an adjustable drawing board located on opposite sides of the track, a projecting bracket on the carriage, an adjustable arcuate member carried by the carriage, concentric with the bracket, two equal straight line link motion members hinged at one end to a common centre on the bracket and at the other separately to points on the arcuate member, a tracing point carried by one member, and a drawing point carried by the opposite member.

3. An apparatus for the purpose specified, comprising in combination, a movable carriage, a track supporting the same, an adjustable projection board, and a drawing board located on opposite sides of the track, a projecting bracket on the carriage, an adjustable arcuate member carried by the carriage, concentric with the bracket, two equal straight line link motion members hinged at one end to a common centre on the bracket, and at the other separately to points on the arcuate member, a tracing point carried by one member and a drawing point carried by the opposite member.

4. The apparatus claimed in claim 1 in which each link motion member comprises two equal bars hinged to the end of a central bar.

5. The arrangement according to claim 1 in which the adjustable drawing board is provided with slow motion adjusting screws.

6. The arrangement as claimed in claim 1 in which the adjustable projection board is provided with slow motion adjusting screws.

7. The arrangement according to claim 1 in which a protector is provided extending between the link motion members.

8. The arrangement according to claim 1 in which the outer ends of the link motion members are adjustably connected to the arcuate member.

9. The arrangement according to claim 1, in which a supporting member is provided parallel to the track, guide bars angularly adjustable between the track and the supporting members, to adjustably carry the projection board.

10. The arrangement according to claim 1, in which the drawing board is adjustably mounted on adjustable guide tracks.

In witness whereof I have hereunto set my hand in the presence of a witness.

DONALDSON BOGART DOWLING.

Witness:
D. T. CUFFS ZIN.